June 9, 1931. L. J. LISHON 1,809,557
AUTOMOBILE TRANSPORTING TRUCK
Filed May 20, 1930 4 Sheets-Sheet 1
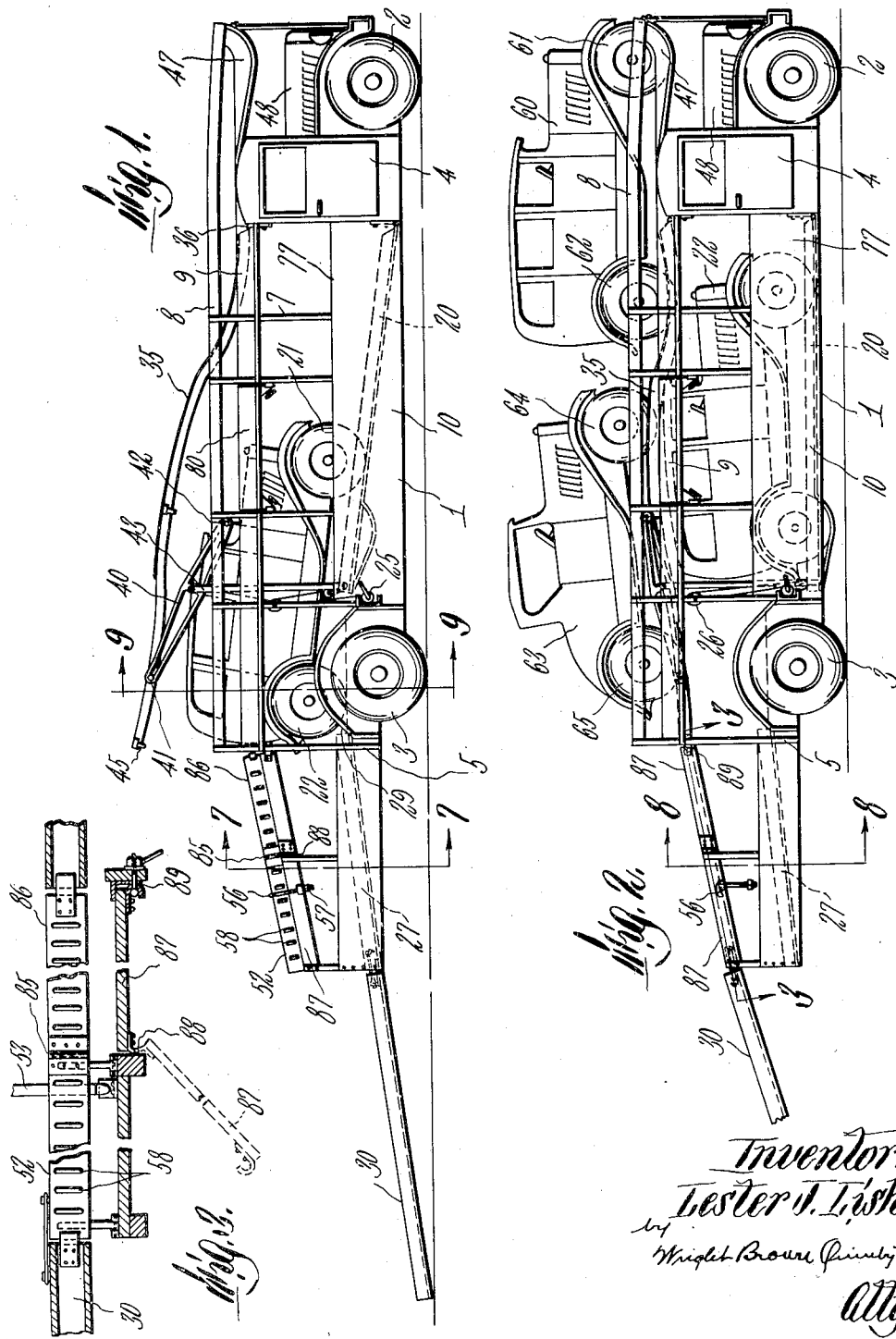
Inventor:
Lester J. Lishon,
by Wright, Brown, Quinby & May
Attys.

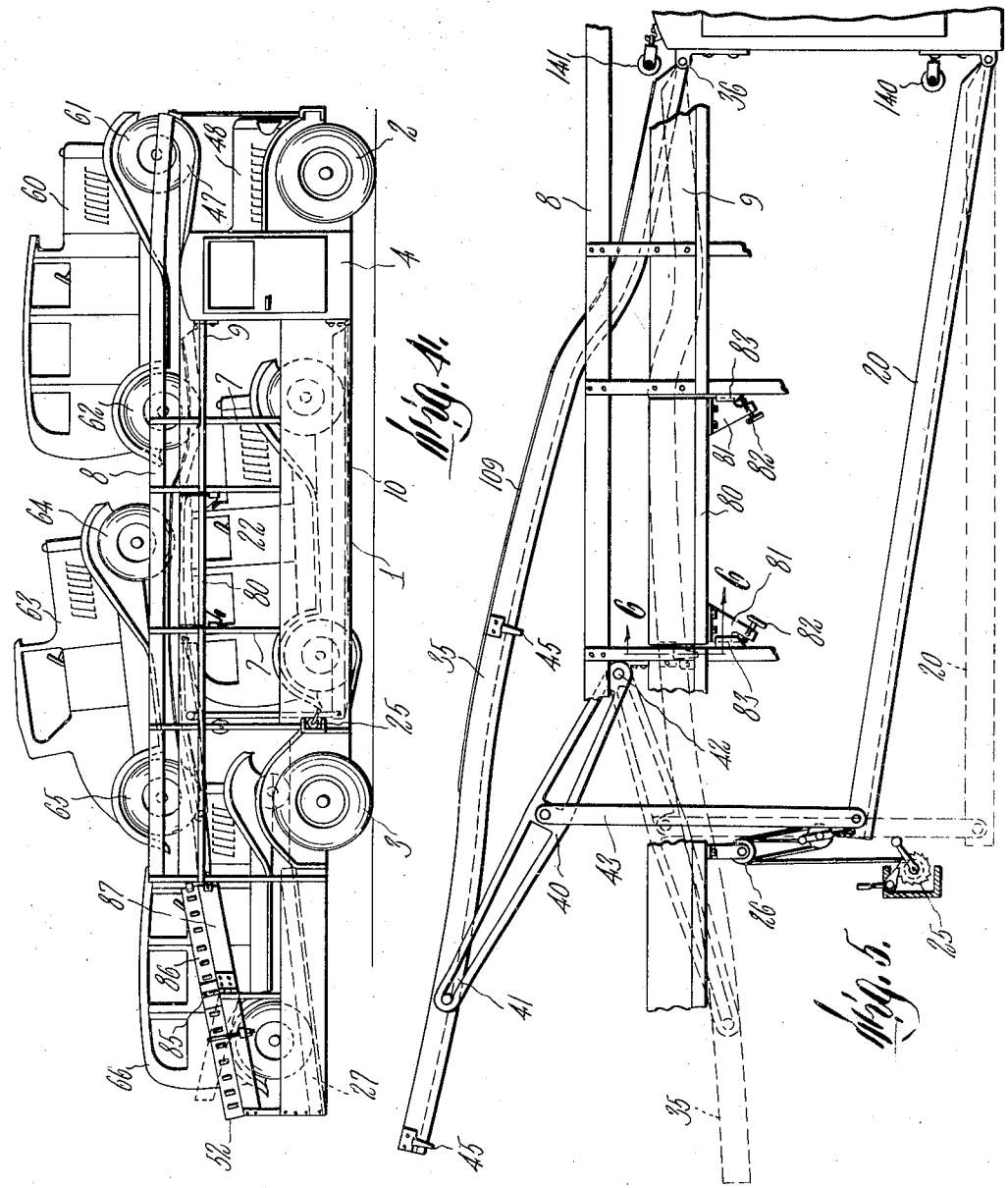

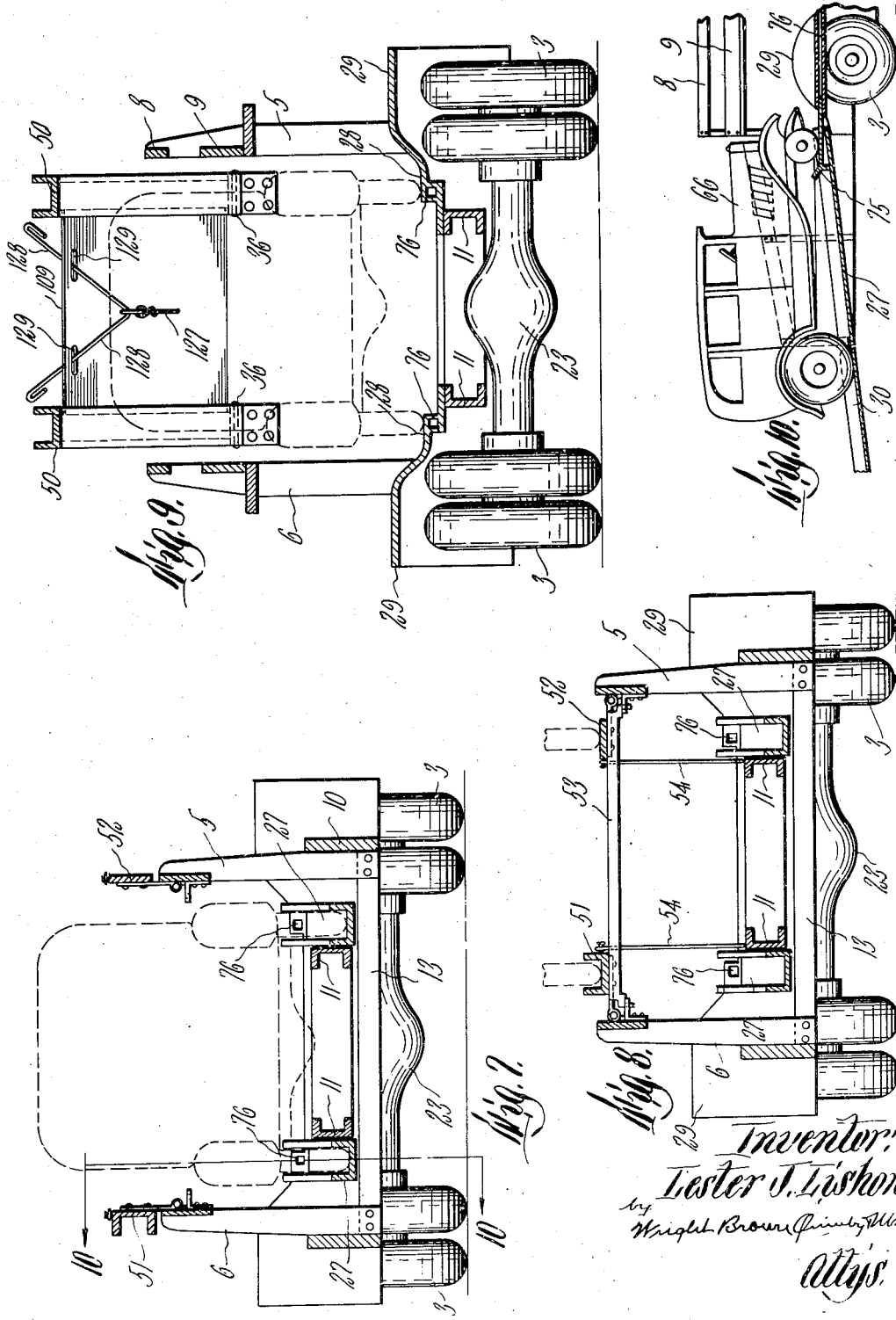

June 9, 1931. L. J. LISHON 1,809,557
AUTOMOBILE TRANSPORTING TRUCK
Filed May 20, 1930 4 Sheets-Sheet 4
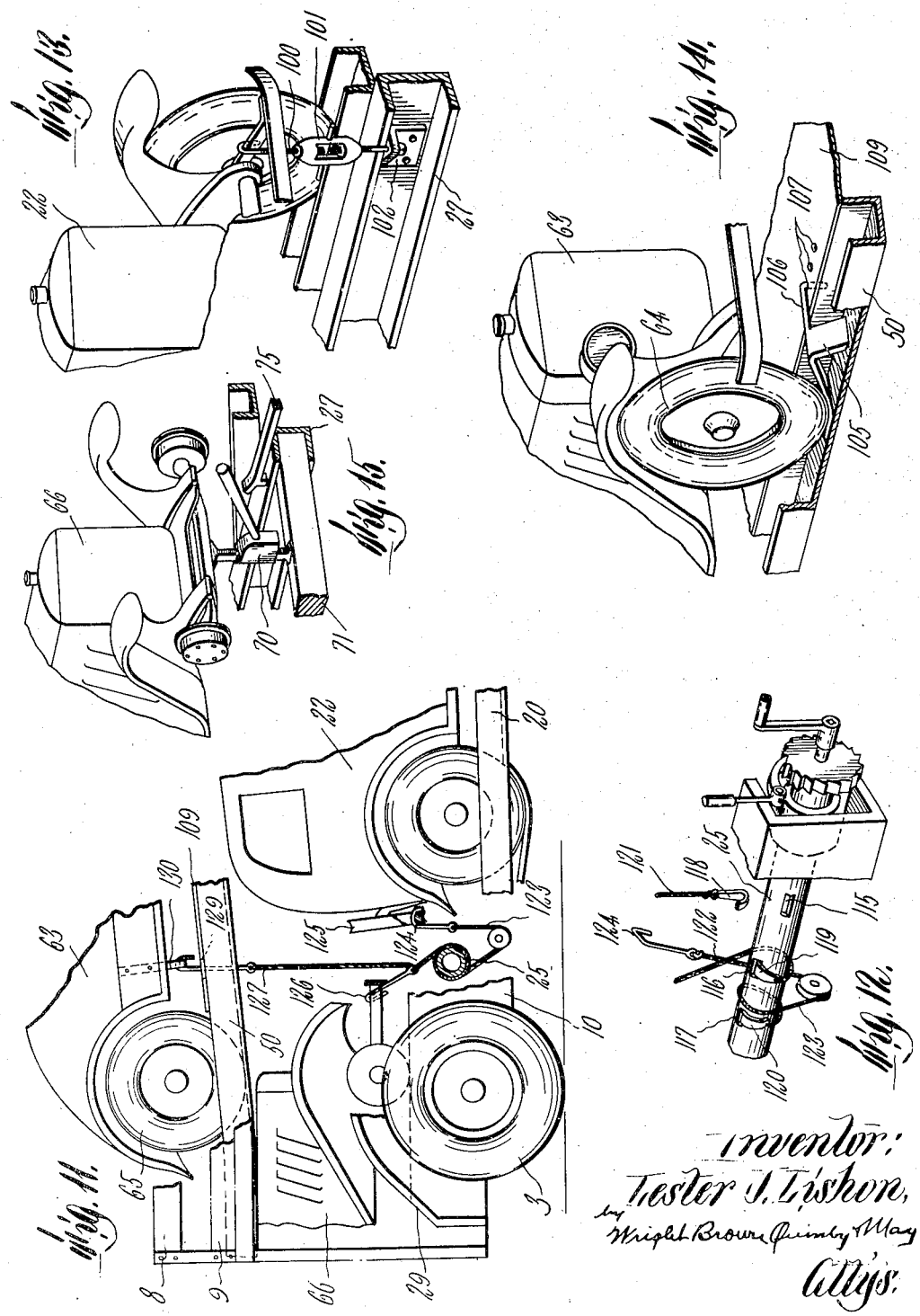

Patented June 9, 1931

1,809,557

UNITED STATES PATENT OFFICE

LESTER J. LISHON, OF BROOKLINE, MASSACHUSETTS

AUTOMOBILE TRANSPORTING TRUCK

Application filed May 20, 1930. Serial No. 453,994.

This invention relates to trucks especially designed for transporting automobiles, and has for an object to so construct a truck as to support the maximum number of cars within the minimum space limits. To this end provision is made for supporting the cars in superposed series, and in order to reduce the head-room necessary, provision is made by which a car positioned between the front and rear wheels of the truck may be lowered beneath that elevation necessary to permit the car to pass over the rear truck axle when it is being loaded or unloaded. Supporting means for a car positioned thereabove is also so formed that it may be raised to permit the car beneath to be driven or pulled over the rear truck axle, whereupon the upper support is lowered with the lower car support in position to receive the upper car.

The invention further consists in the arrangement of parts by which the cars on the upper and lower levels may be directed to or from their proper loaded positions, means for securing the cars when in such positions, and various other structural features by which desirable advantages are secured and which will be more fully apparent from a more complete description of one embodiment of this invention shown in the accompanying drawings in which Figure 1 is a side elevation of the truck arranged for loading or unloading the forward lower car, the car being shown as part way toward loaded position.

Figure 2 is a similar view showing the position of the parts when three cars have been loaded.

Figure 3 is a detail section on line 3—3 of Figure 2.

Figure 4 is a view similar to Figures 1 and 2, except that four cars are loaded.

Figure 5 is a fragmentary view to a larger scale of the lower front and rear top car supporting mechanism.

Figure 6 is a detail section on line 6—6 of Figure 5.

Figures 7 and 9 are sections on lines 7—7 and 9—9, respectively, of Figure 1.

Figure 8 is a section on line 8—8 of Figure 2.

Figure 10 is a fragmentary section on line 10—10 of Figure 7.

Figure 11 is an elevation showing certain of the car securing means.

Figure 12 is a detail perspective of a winch.

Figures 13 and 14 are perspectives partly broken away of other car-receiving means.

Figure 15 is a detail in perspective.

Referring to the drawings, the truck as shown comprises a frame work indicated generally at 1 supported on spaced pairs of front and rear wheels 2 and 3. Between these pairs of wheels is a cab 4 which as shown extends the entire width of the vehicle and forms part of the supporting frame work for the automobile carrier mechanism as will later appear. Fixed to the rear face of the cab 4 are opposite side frames 5 and 6 having upright members 7 and horizontal frame members 8, 9 and 10. At 11 are shown longitudinally extending chassis members which support the side frames 5 and 6 between the front and rear pairs of wheels 2 and 3, the side frames being extended rearwardly of the rear wheels 3 where they are joined by transversely extending frame members 13, as shown best in Figures 7 and 8.

Pivoted to the rear lower portion of the cab 4 are a pair of channel shaped members 20 which together form a supporting platform for the reception of an automobile carried between the cab 4 and the rear truck wheels 3. The rear ends of these channel members 20 may be elevated as shown in dotted lines in Figure 1 to such a position that they may receive the forward wheels 21 of a vehicle 22, which is to be transported, as this vehicle is run up a suitable incline and over the rear axle housing 23 of the truck. After this vehicle 22 is positioned entirely forwardly of the rear truck wheels 3, the rear ends of these channel members 20 may be lowered into substantially horizontal position so that the vehicle 22 when loaded is hung below the level of the truck rear axle housing 23. The raising and lowering of the rear ends of the channels 20 may be done by any suitable means, but as herein shown a winding shaft or winch 25 and suitable block and tackle mechanism 26 are employed for the purpose.

As before noted the side frames extend rearwardly of the truck rear wheels 3 and between them is carried the spaced inclined channel members 27 which lead upwardly from the rear end of the truck toward the axle housing 23 and onto guide pieces 28 (see Figure 9) forming portions of the rear truck wheel fenders 29 over the axle housing 23 and substantially to the rear ends of the channels 20 when these are in elevated positions. Separable channel shaped skids 30, as shown in Figures 1 and 2, may be secured to the rear ends of the channel members 27 and in alinement therewith so as to permit the car to be loaded to be run up under its own power or to be pulled up over the rear truck axle and lowered into position between the front and rear sets of truck wheels, as shown in Figure 1. When the car has thus been deposited between the front and rear truck wheels, other vehicles may be placed in superposed relation thereto. For this purpose, above the vehicle 22 is positioned a vehicle-supporting platform 35 which is hinged at its forward end as at 36 to the upper portion of the cab 4 and which is arched upwardly and extended rearwardly to a point somewhat in the rear of the rear truck wheels 3. In order that this platform 35 may be as low as possible without striking the roof of the car 22 and yet permit ingress and egress of this vehicle when the lower platform is raised, provision is made by which this platform 35 may also be raised, and in order to provide sufficient headroom for the car 22 it is desirable that the swinging motion of this platform 35 be greater in extent than that of the lower platform comprising the channels 20. To this end at opposite sides of the platform 35 are positioned levers 40, the rear ends of which are pivoted through slotted portions as at 41 to the sides of the upper platform 35 and the forward ends of which as at 42 are pivoted to the upper portion of the truck side frames. At an intermediate portion of each of the levers or arms 40 is pivotally connected the upper end of a link 43, the lower end of which is pivoted to the rear end portion of the correspondingly positioned channel 20. Thus as the rear ends of the channels 20 are raised and lowered, the rear end of the upper supporting platform 35 is likewise raised and lowered but to a greater extent.

In order that this upper platform 35 may act as a cross brace to the upper portions of the truck side frames, these side frames and the platform 35 may be provided with interengaging elements which tie the side frames rigidly together when the platform is in lowered position. As shown best in Figures 5 and 6 such elements comprise tapered lugs 45 on the platform 35 which enter tapered sockets 46 carried by the side frame members 9. The platform 35 is provided with a rigid forward extension 47 arched upwardly over the cab 4 and then downwardly over the truck engine hood 48. When the platform 35 is in lowered position, the rear ends of its side channel guideways 50, which are spaced apart to receive the wheels of the upper tier of vehicles to be transported, are in substantial alinement with upwardly inclined runways 51 and 52 hinged to the rearward extensions of the truck side frame members when these ways 51 and 52 are in horizontal positions as shown in Figure 8. These ways 51 and 52 when in lowered position may rest upon a transverse bar 53 extending between the side frames and they may be further supported at their rear ends by rods 54 hinged at their upper ends to these ways and resting at their lower ends on the chassis frames 11. They may, however, be turned up as shown in Figure 7 to permit another vehicle to be loaded in the rear portion of the truck between them as shown in dotted outlines in this figure. When in such position they may be so retained as by means of hooks 56 which may be engaged thereover and which at their lower ends may have nuts 57 threaded thereon by which they may be drawn down over the ways to hold them firmly. As shown the way 51 is formed with a channel section and the way 52 is flat. They may be provided with lateral cleats 58 in order to provide a better gripping surface for the vehicle wheels. When these ways are in lowered condition, as shown in Figures 2 and 8, they are in position to have attached to their lower ends the loading skids 30 so that the cars may be run up these skids onto the ways 51 and 52 and onto the platform 35. The first vehicle 60 to be loaded in this manner is run so far forward that its front wheels 61 rest in the forward extensions 47 above the truck engine hood 48 and its rear wheels 62 rest on the forward portion of the platform 35. This leaves sufficient room for a second vehicle 63 to be run up onto the platform 35 with its forward wheels 64 resting above the vehicle 22 and its rear wheels 65 above the rear truck wheels 3. The skids 30 are then detached from the ways 51 and 52, these ways are folded back in the positions in Figures 1 and 7, the skids 30 are then fixed to the rear ends of the channel 57 and a fourth vehicle 66 is run up behind the vehicle 22.

In order that the forward portion of this fourth vehicle 66 may be lowered sufficiently to pass beneath the rear end portion of the rear upper vehicle, provision is made to facilitate the removal of the forward wheels of this fourth vehicle and to support this fourth vehicle at its forward end on the brake drums of the front axle. To this end a jack 70 may be supported on a cross frame member 71 slightly to the rear of the rear truck axle housing 23 and this may be swung up into position to engage the front axle of the fourth vehicle 66 to be loaded. By manipulation of this jack the front axle of the fourth vehicle may be raised and its wheels removed. Supplemental track members 75 may then be placed in position with their ends on the chassis frame members 28 extending over the rear axle housing as shown best in Figure 10, and engaging in sockets 76 rearwardly of this rear axle housing 23 as shown in Figure 9. The jack 70 may then be manipulated to lower the forward end of the fourth vehicle 66 onto these supplemental track members and this vehicle may then be run forwardly into final loaded position, as shown in Figure 4, with its front axle slightly forwardly of the rear truck wheels 3 and its hood positioned beneath the rear wheels of the rear superposed car which rests on the platform 35. The wheels removed from this fourth vehicle may be placed in suitable pockets 77 on the inner faces of the side frame members 10.

In order that the driver of the lower front car 22 and the fourth car 66 may be able to leave or enter these cars at will, portions of the side frames opposite to the doors of these cars are shown as removable. For example, for the forward car 22 a portion of the longitudinal frame member 9 as at 80 is removable, being provided, as best shown in Figure 5, with brackets 81 through which are extended screws 82 which may be engaged beneath abutment blocks 83 on the adjacent uprights 7 of the side frames in order to secure these members 80 in position.

For the fourth car 66 the runway member 52 is shown as hinged substantially centrally as at 85 so that its forward end 86 may be swung outwardly when this member is in vertical folded position and the side frame member 87 therebelow is similarly hinged at 88 so that the upper portion of the rearwardly extended side frame on one side may be open, the member 87 being shown in dotted lines in Figures 3 and 4 in open position to permit the driver of the fourth car 66 to enter or leave the vehicle. The portion 87 may be fixed at its forward end in closed position as by means of a threaded latch mechanism shown at 89 in Figure 3.

Means is provided for retaining the several loaded vehicles in loaded position, such means being shown more particularly in Figures 11 to 14. The forward vehicle 22 may be fixed in position by the use of a hook member 100 having a turn buckle 101 at an intermediate portion, as shown in Figure 13, the upper end of this hook being engaged over a suitable portion of this vehicle, as, for example, the bumper and its lower end fixed as at 102 to the truck chassis member 27. The front upper vehicle 60 is quite well supported by engagement of its wheels against the forward upwardly turned ends of the extensions 47 and ordinarily needs no particular fastening, though if desired, a hook member similar to the member 100 heretofore described may be employed. One or both of the forward wheels of the rear upper vehicle may be supported against forward motion by means of a separable chock as 105 shown in Figure 14 having a portion which rests in the channel 50 of the upper platform member 35 and a hooked stem portion 106 which may be engaged in any selected one of a series of holes 107 through a plate 109, which bridges across the channel members 50. This plate 109 acts to prevent foreign matter such as oil or the like from the upper tier of cars from dripping onto the lower car 22 positioned underneath the platform 35.

The rear end of this rear upper car, the rear end of the car 22, and the forward end of the fourth car may all be secured as by means of the winding shaft 25, as shown best in Figures 11 and 12. The shaft 25 may have suitable slots 115, 116 and 117 for the reception of hooks 118, 119 and 120 carried by retaining cables 121, 122 and 123. The cable 122 is shown as carrying a hook 124 which may be engaged with the rear tire carrier 125 of the vehicle 22. The cable 122 may have a hook 126 thereon which may be engaged with the front bumper of the fourth vehicle and it may also have attached thereto a cable 127 which may be engaged with a bifurcated hook member 128 (see Figures 11 and 9), the branches of which extend through slots 129 in the plate 109 of the upper platform and are engaged with a cross frame piece 130 of the upper rear car. By turning the winding shaft in the proper direction, these cables are wound thereon, thus drawing the cars down against their springs and securing them together.

The cable 121 may be employed in place of the cable 127 if desired, or the cable 121 may be employed in case it is inconvenient to run the cars into position on the truck under their own power. Where this is the case, this cable may be extended about sheaves positioned at suitable points such as at 140 and 141, as in Figure 5, and attached to the cars to be loaded so that by rotation of the winding shaft, these cars may be drawn up into their desired loaded positions onto the truck.

An embodiment of this invention having thus been described, it will be evident to those skilled in the art that various changes and modifications may be made therein without departing from the spirit or scope of this invention as defined by the appended claims.

I claim:

1. A device of the class described comprising a frame having front and rear pairs of supporting wheels, said rear wheels having an axle extending therebetween, a vehicle support movable relative to said frame and positioned between said pairs of wheels, and means for adjusting the rear end of said support between a position to receive the wheels of a vehicle passed over said axle and a position substantially below said receiving position.

2. A device of the class described having front and rear pairs of supporting wheels, said rear wheels having an axle, a support for a vehicle positioned between said pairs of wheels hingedly supported at its forward end, and means for adjusting the rear end of said support between a position to receive the wheels of a vehicle passed over said axle and a position substantially below said receiving position.

3. A device of the class described having front and rear pairs of supporting wheels, said rear wheels having an axle, a pair of vehicle supports between said pairs of wheels, said supports being spaced one above the other sufficiently to permit a vehicle to pass therebetween, and means for adjusting the rear end of the lower of said supports from a position to receive the wheels of a vehicle passed over said axle to a position substantially below said receiving position.

4. A device of the class described having front and rear pairs of supporting wheels, said rear wheels having an axle, a pair of vehicle supports between said pairs of wheels, said supports being spaced one above the other sufficiently to permit a vehicle to pass therebetween, and means for adjusting the rear end of the lower of said supports from a position to receive the wheels of a vehicle passed over said axle to a position substantially below said receiving position, said adjusting means being connected to impart similar motion to the rear end of the upper of said supports.

5. A device of the class described having front and rear pairs of supporting wheels, said rear wheels having an axle, a pair of vehicle supports between said pairs of wheels, said supports being spaced one above the other sufficiently to permit a vehicle to pass therebetween, and means for adjusting the rear end of the lower of said supports from a position to receive the wheels of a vehicle passed over said axle to a position substantially below said receiving position, said adjusting means being connected to impart similar motion to the rear end of the upper of said supports, said upper support being arched upwardly between its ends to clear the body portion of a vehicle on said lower support.

6. A device of the class described having front and rear pairs of supporting wheels, said rear wheels having an axle, a pair of vehicle supports between said pairs of wheels, said supports being spaced one above the other sufficiently to permit a vehicle to pass therebetween, and means for adjusting the rear end of the lower of said supports from a position to receive the wheels of a vehicle passed over said axle to a position substantially below said receiving position, said adjusting means being connected to impart similar motion to the rear end of the upper of said supports, the forward ends of said upper support being positioned to carry one pair of wheels of a vehicle with another pair of wheels of said vehicle above said front pair of wheels.

7. A device of the class described having a frame, front and rear pairs of wheels for supporting said frame, a cab back of said front wheels, a vehicle support extending rearwardly from the lower portion of said cab toward said rear wheels for supporting a vehicle between said pairs of wheels, said frame being extended back from said rear pairs of wheels and constructed to support a vehicle back of said first mentioned vehicle, and supports carried by said frame for holding a vehicle with one pair of wheels forwardly of said cab and the other pair rearwardly of said cab and above said first mentioned vehicle, and for holding another vehicle entirely back of said cab above said first and second mentioned vehicles.

8. A device of the class described comprising a pair of side frames, front and rear pairs of wheels for supporting said side frames, superposed vehicle supporting platforms between said side frames, and means carried by the upper of said platforms engageable with said side frames to hold said side frames in fixed spaced relation.

9. A device of the class described comprising a pair of side frames, front and rear pairs of wheels for supporting said side frames, a cab carried by said side frames, superposed vehicle-supporting platforms carried between said side frames, the upper of said platforms being hinged at its forward end to said cab, and interengaging elements on said upper platform and said frames for bracing said side frames laterally when said upper platform is in lowered position.

10. A device of the class described comprising a pair of side frames, wheels for supporting said side frames, a pair of superposed vehicle supports positioned between said frames, the lower of said supports extending beyond one end of the upper of said supports, and inclined track members leading to the upper of said supports and carried by said side frames above said extended portions.

11. A device of the class described comprising a pair of side frames, wheels for supporting said side frames, a pair of superposed vehicle supports positioned between said frames, the lower of said supports extending beyond one end of the upper of said supports, and inclined track members leading to the upper of said supports and hinged to said side frames above said extension to be adjustable between operation positions and folded against said side walls in inoperative positions.

12. A device of the class described comprising wheel-supported side frames, a support for a vehicle between said side frames, and clamping means for rigidly and detachably securing a portion of one of said side frames, the removal of which portion permits ingress to and egress from said vehicle while on said support.

13. A device of the class described comprising spaced pairs of supporting wheels, one of said pairs of wheels having an axle extending therebetween, a vehicle support between said pairs of wheels, track members spaced to receive opposite wheels of a vehicle having brake drums concentric with said wheels, said members leading over said axle toward said support, and supplemental track members adjacent to said axle positioned to support said brake drums for rotation thereon.

14. A device of the class described comprising spaced pairs of supporting wheels, one of said pairs of wheels having an axle extending therebetween, a vehicle support between said pairs of wheels, track members spaced to receive opposite wheels of a vehicle having brake drums concentric with said wheels, said members leading over said axle toward said support, supplemental track members adjacent to said axle positioned to support said brake drums for rotation thereon, and a vehicle lifting means positioned to lift said vehicle to permit removal of its wheels from said members and then to lower said vehicle to bring said drums into contact with said supplemental track members.

15. A device of the class described having spaced pairs of supporting wheels, a frame carried by said wheels, a pair of superposed vehicle supports pivoted to said frame between said pairs of wheels, connections between said supports remote from their pivots for insuring simultaneous and unequal swinging motion of said supports about their respective pivots, and means for producing such motion.

16. A device of the class described having spaced pairs of supporting wheels, a frame carried by said wheels, a pair of superposed vehicle supports pivoted to said frame between said pairs of wheels, a lever pivoted at opposite ends to said frame and the upper of said supports remote from its hinge connection, a link connecting the lower of said supports to an intermediate portion of said lever, and means for raising and lowering one of said supports upon its hinge connection.

17. A device of the class described comprising a pair of side frames, wheels for supporting said side frames, a vehicle support positioned between said frames, and inclined track members leading to said support and hinged to said side frames to be turnable from operative positions to positions folded toward said side frames.

In testimony whereof I have affixed my signature.

LESTER J. LISHON.